United States Patent
Choi

(10) Patent No.: US 8,291,211 B2
(45) Date of Patent: Oct. 16, 2012

(54) SYSTEM EMBEDDING PLURAL CONTROLLER SHARING NONVOLATILE MEMORY

(75) Inventor: Sung-Up Choi, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/037,599

(22) Filed: Mar. 1, 2011

(65) Prior Publication Data

US 2011/0153921 A1 Jun. 23, 2011

Related U.S. Application Data

(62) Division of application No. 11/846,365, filed on Aug. 28, 2007, now Pat. No. 7,913,073.

(30) Foreign Application Priority Data

Sep. 19, 2006 (KR) .................. 10-2006-0090868

(51) Int. Cl.
  *G06F 15/177* (2006.01)
(52) U.S. Cl. ................................. 713/2; 713/1
(58) Field of Classification Search .................. 711/147, 711/148, 150, 151, 152
  See application file for complete search history.

(56) References Cited

U.S. PATENT DOCUMENTS

| 6,895,479 | B2 * | 5/2005 | Reimer et al. | 711/152 |
| 7,870,545 | B2 * | 1/2011 | Saha et al. | 717/159 |
| 2006/0053246 | A1 * | 3/2006 | Lee | 711/100 |
| 2008/0022054 | A1 * | 1/2008 | Hertzberg et al. | 711/152 |

* cited by examiner

Primary Examiner — Dennis M Butler
(74) Attorney, Agent, or Firm — F. Chau & Associates, LLC

(57) ABSTRACT

An embedded memory card system includes a first CPU, a second CPU, a nonvolatile memory storing data, and a device busy state machine selecting one of the first CPU and the second CPU to access the nonvolatile memory. The nonvolatile memory is accessed by the one of the first CPU and the second CPU selected by the device busy state machine.

30 Claims, 2 Drawing Sheets

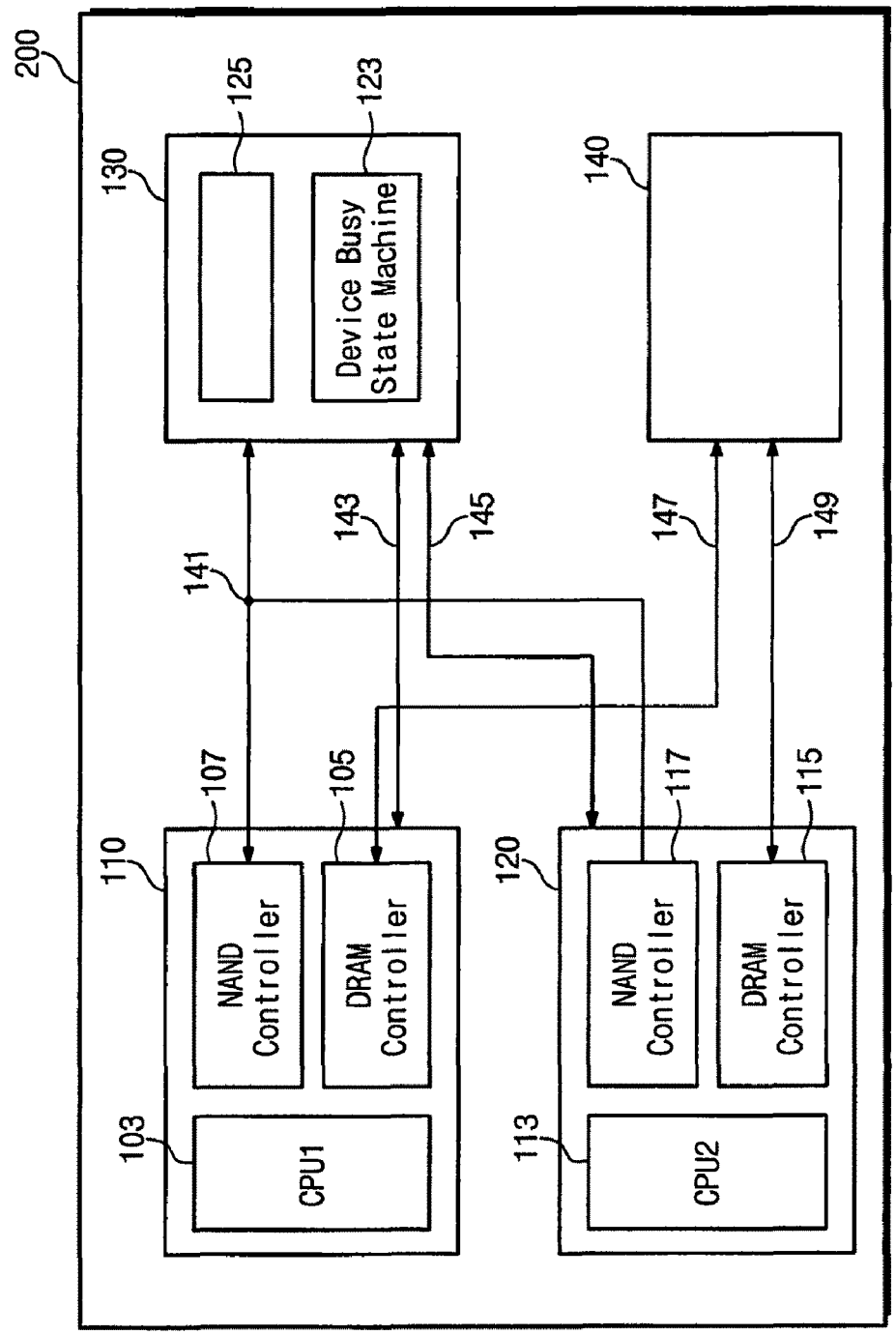

SYSTEM EMBEDDING PLURAL CONTROLLER SHARING NONVOLATILE MEMORY

CROSS-REFERENCE TO RELATED APPLICATIONS

This application is a divisional application of U.S. patent application Ser. No. 11/846,365, filed on Aug. 28, 2007 now U.S. Pat. No. 7,913,073, which claims priority under 35 U.S.C. §119 to Korean Patent Application No. 10-2006-90868, filed on Sep. 19, 2006, the entire contents of which are hereby incorporated by reference.

BACKGROUND OF THE INVENTION

1. Technical Field

The present invention relates to nonvolatile memory, and more particularly, to a system embedding plural controller sharing nonvolatile memory.

2. Discussion of the Related Art

High-capacity flash memory cards have been embedded in mobile devices. One example of an embedded flash memory card is called a moviNAND. The moviNAND is an embedded NAND flash memory using a multi-media card (MMC) interface protocol.

When the moviNAND is embedded in a system, a processor accesses the embedded flash memory using the MMC interface protocol.

SUMMARY OF THE INVENTION

Exemplary embodiments of the present invention provide a system that can be booted using a moviNAND.

Exemplary embodiments of the present invention also provide an apparatus capable of storing or accessing data using a nonvolatile memory in a dual core system.

Exemplary embodiments of the present invention provide systems including a CPU, a nonvolatile memory storing a booting code and data, a card slave controller controlling the nonvolatile memory, a card host controller communicating with the card slave controller, and a memory controller controlling an external memory. The memory controller directly accesses the nonvolatile memory to read the booting code under the control of the CPU in a boot operation.

In some exemplary embodiments, in a normal operation, the memory controller accesses the external memory under the control of the CPU, and the card host controller accesses the data of the nonvolatile memory through the card slave controller.

In some exemplary embodiments, the nonvolatile memory includes a NAND flash memory.

In some exemplary embodiments, the memory controller uses a NAND interface protocol.

In some exemplary embodiments, the card slave controller uses an MMC interface protocol.

In some exemplary embodiments of the present invention, systems include a CPU, a nonvolatile memory storing a booting code and data, a memory controller reading the booting code of the nonvolatile memory through a first access path under the control of the CPU, and an external memory accessed by the memory controller through a second access path under the control of the CPU.

In some exemplary embodiments, the first access path comprises a bus connected between the memory controller and the nonvolatile memory and a first transmission gate connected to the bus.

In some exemplary embodiments, the first transmission gate is activated by the CPU in a boot operation.

In some exemplary embodiments, the second access path comprises a bus connected between the memory controller and the external memory and a second transmission gate connected to the bus.

In some exemplary embodiments, the second transmission gate is activated by the CPU in a normal operation.

In some exemplary embodiments, the system further includes a card host controller accessing the nonvolatile memory through a card slave controller.

In some exemplary embodiments of the present invention, systems include a first CPU, a second CPU, a nonvolatile memory storing data, and a device busy state machine selecting one of the first CPU and the second CPU to access the nonvolatile memory. The nonvolatile memory is accessed by the one of the first CPU and the second CPU selected by the device busy state machine.

In some exemplary embodiments, the device busy state machine supports a dual core CPU having the first and second cores using a round-robin method.

In some exemplary embodiments, the device busy state machine supports a dual core CPU having the first and second cores using a master-slave method.

In some exemplary embodiments, the nonvolatile memory includes a NAND flash memory.

BRIEF DESCRIPTION OF THE DRAWINGS

These and/or other aspects and features of the exemplary embodiments of the present inventive concept will become apparent and more readily appreciated from the following description of the exemplary embodiments, taken in conjunction with the accompanying drawings of which:

FIG. 2 is a block diagram of a system for accessing one nonvolatile memory in a system embedding a dual core CPU according to an exemplary embodiment of the present invention.

DETAILED DESCRIPTION OF EXEMPLARY EMBODIMENTS

Figure 1:
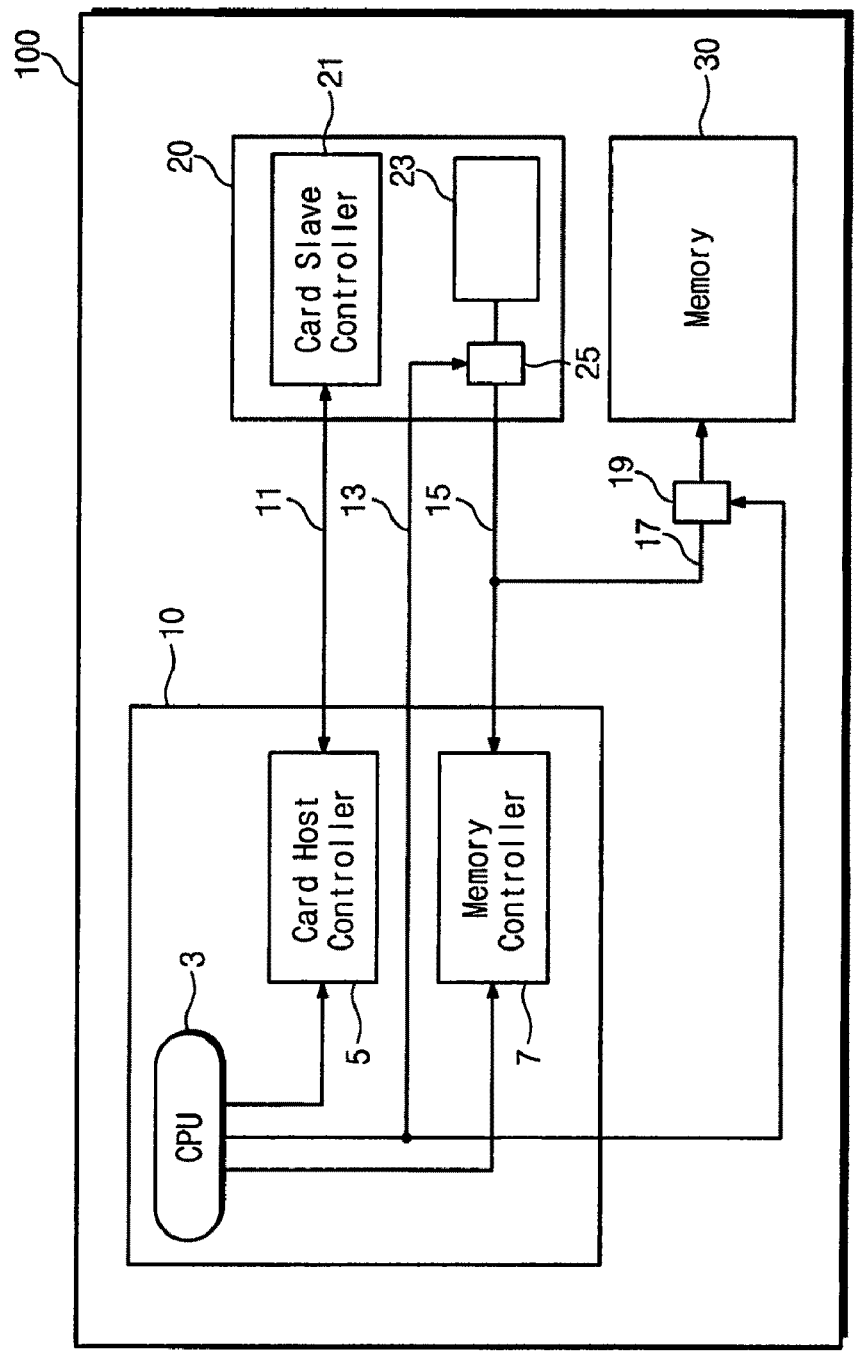
FIG. 1 is a block diagram of a system embedding a moviNAND according to an exemplary embodiment of the present invention.

Reference will now be made to exemplary embodiments of the present invention in conjunction with the accompanying drawings.

FIG. 1 is a block diagram of a system 100 embedding a moviNAND according to an exemplary embodiment of the present invention. Referring to FIG. 1, the system 100 includes a CPU core 10, a moviNAND 20, and a memory 30.

The CPU core 10 performs a processing operation in the system 100. The CPU core 10 includes a CPU 3, a card host controller 5, and a memory controller 7. The CPU 3 is a central processing unit. The card host controller 5 interfaces with the moviNAND 20, and the memory controller 7 interfaces with the memory 30.

The moviNAND 20 includes an embedded NAND flash memory that uses an MMC interface protocol. The moviNAND 20 includes a card slave controller 21, a NAND flash memory 23, and a transmission gate 25. The card slave controller 21 interfaces with the card host controller 5. The NAND flash memory 23 is a nonvolatile memory. The transmission gate 25 connects or disconnects a bus 15 under the control of the CPU 3. The memory 30 may include a dynamic random access memory (DRAM), a static random access memory (SRAM), or the like.

Exemplary embodiments of the present invention further include a bus capable of directly accessing a flash memory in a moviNAND and a control signal controlling it.

For example, the memory controller 7 accesses the nonvolatile NAND flash memory 23 through the bus 15. The memory controller 7 accesses the memory 30 through a bus 17.

In a boot operation of the system 100, the NAND flash memory 23 is connected with the memory controller 7 through the transmission gate 25 under the control of the CPU 3. When the system 100 operates normally, the memory 30 is connected with the memory controller 7 through a transmission gate 19 under the control of the CPU 3. The system 100 accesses the moviNAND 20 through a bus 11.

Therefore, when the moviNAND 20 is embedded in the system 100, the CPU 3 directly accesses the NAND flash memory 23 in the moviNAND 20 to read booting or program code, thereby booting the system 100.

FIG. 2 is a block diagram of a system for accessing nonvolatile memory in a system having a dual core CPU. Conflict between two CPU cores accessing one memory can be prevented, even in the case where a dual core CPU is embedded in the system.

Referring to FIG. 2, a system 200 includes a first CPU core 110, a second CPU core 120, a storage device 130, and a memory 140. The first CPU core 110 includes a CPU 103, a DRAM controller 105, and a NAND controller 107. The second CPU core 110 includes a CPU 113, a DRAM controller 115, and a NAND controller 117. The CPUs 103 and 113 are central processing units. The DRAM controllers 105 and 115 control a DRAM outside the first and second CPU cores 110 and 120. The NAND controllers 107 and 117 control a nonvolatile memory 125 in the storage device 130.

The storage device 130 includes a device busy state machine 123 and the nonvolatile memory 125. The device busy state machine 123 controls the first and second CPU cores 110 and 120 using an interrupt signal for using a bus 141. The nonvolatile memory 125 stores a booting code for booting the system 200 and data.

The memory 140 includes a DRAM having a dual port. In the system 200 including the dual core CPU, when one of the first and second CPUs 103 and 113 accesses the one nonvolatile memory 125, the nonvolatile memory 125 is accessed by one of the first and second CPUs 103 and 113 under the control of the device busy state machine 123.

One of the first and second CPUs 103 and 113 may be selected using a round-robin method of supporting the first and second CPUs 103 and 113 in sequential order. Alternatively, a master-slave method may be used, in which the first CPU 103 operates as a master and the second CPU 113 operates as a slave provided that the first and second CPUs 103 and 113 are selected as a main processor and a co-processor, respectively.

In the system 200, when the first CPU 103 is to access the nonvolatile memory 125, the first CPU 103 requests that the device busy machine 123 access the nonvolatile memory 125. The device busy state machine 123 controls the first CPU 103 to access the nonvolatile memory 125 in response to the request of the first CPU 103.

When the first and second CPUs 103 and 113 are to access the nonvolatile memory 125 simultaneously, the device busy state machine 123, employing a round-robin method, sequentially responds to the requests of the first and second CPUs 103 and 113.

When the device busy state machine 123 controls the first and second CPUs 103 and 113 using a master-slave method (assuming that the first CPU 103 is a man processor) the device busy state machine 123 controls the first CPU 103 to access the nonvolatile memory 125 prior to the second CPU 113 in response to the requests of the first and second CPUs 103 and 113.

In a system embedding a flash memory using an MMC interface protocol, the system is not booted using the MMC interface protocol. Therefore, exemplary embodiments of the present invention provide a booting system using a flash memory in a system including an embedded flash memory by adding an access path for directly accessing a flash memory.

Exemplary embodiments of the present invention provide a system preventing conflict between two processors when the two processors access one nonvolatile memory simultaneously, even in the case where data are stored and accessed using the one nonvolatile memory in a dual core system.

According to exemplary embodiments of the present invention, a system can be booted using a moviNAND.

Also, data can be stored or accessed using one nonvolatile memory in a dual core system.

While exemplary embodiments of the present invention have been particularly shown and described with reference to the drawings, it will be understood by those of ordinary skill in the art that various changes in form and details may be made without departing from the spirit and scope of the present invention.

What is claimed is:

1. A portable electronic system, comprising:
a first CPU core;
a second CPU core;
a card storage device including a nonvolatile memory having a boot code and data;
a memory controller coupled to the card storage device to access the boot code in the nonvolatile memory; and
a device busy state machine selecting one of the first CPU core and the second CPU core to access the nonvolatile memory of the card storage device,
wherein the device busy state machine is activated by a request sent by either the first CPU core or the second CPU core in a boot operation and the device busy state machine controls either the first CPU core or the second CPU core to access the nonvolatile memory in response to the request, and
wherein the first CPU core and the second CPU core are coupled to the memory controller to access the boot code, and the memory controller accesses the boot code in the card storage device through an interface having an interface protocol.

2. The system of claim 1, further comprising a card host controller.

3. The system of claim 2, wherein the card host controller comprises a card interface using an MMC interface protocol.

4. The system of claim 1, wherein the first CPU core and the second CPU core access the boot code when a system reset is released.

5. The system of claim 1, further comprising a random access memory (RAM) accessed by the first CPU core or the second CPU core.

6. The system of claim 5, wherein the RAM comprises a DRAM.

7. The system of claim 5, wherein the RAM comprises a dual port DRAM.

8. The system of claim 1, wherein the card storage device includes a non-volatile memory to store the boot code and the data.

9. The system of claim 8, wherein the non-volatile memory comprises a NAND flash memory.

10. The system of claim 8, wherein the card storage device further comprises a card slave controller.

11. The system of claim 1, wherein the interface protocol comprises a NAND flash protocol.

12. The system of claim 1, wherein the device busy state machine supports a dual core CPU, wherein the device busy state machine shares access to the card storage device between the first and second CPU cores using a round-robin method.

13. The system of claim 1, wherein the device busy state machine supports a dual core CPU, wherein the device busy state machine shares access to the nonvolatile memory between the first and second CPU cores using a master-slave method.

14. The system of claim 1, wherein the portable electronic device comprises a personal digital assistant (PDA).

15. A method of accessing a card storage device, including a nonvolatile memory, by a first CPU core and a second CPU core, the method comprising:
activating a device busy state machine by sending a request from one CPU core of the first and second CPU cores;
selecting one CPU core of the first and second CPU cores;
requesting access to the card storage device through an interface protocol by the selected CPU core; and
granting the access request from the selected CPU core to access the nonvolatile memory of the card storage device through the interface protocol in a boot operation.

16. The method of claim 15, wherein the selecting of the one CPU core is performed using a round-robin method.

17. The method of claim 16, wherein the first CPU core and the second CPU core are selected successively to access to the card storage device.

18. The method of claim 15, wherein the selecting of the CPU core is performed using a master-slave method.

19. The method of claim 18, wherein the selected CPU core accesses to the card storage device as a main processor, wherein the non-selected CPU core accesses to the card storage device as a co-processor.

20. The method of claim 15, wherein the interface protocol comprises a NAND flash interface protocol.

21. The method of claim 15, further comprising:
transferring data from the nonvolatile memory of the card storage device to a dual port memory.

22. An embedded system, comprising:
a first CPU core;
a second CPU core;
a card host controller to access data through a first interface having first card interface protocol;
a memory controller to access a boot code stored in a nonvolatile memory through a second interface having a second card interface protocol; and
a device busy state machine selecting one of the first CPU core and the second CPU core to access the nonvolatile memory,
wherein the device busy state machine is activated by a request sent by either the first CPU core or the second CPU core in a boot operation and the device busy state machine controls either the first CPU core or the second CPU core to access the nonvolatile memory in response to the request, and
wherein the first and the second CPU core are coupled to the memory controller to access the boot code, and the first and the second CPU core are coupled to the card host controller to access the data.

23. The system of claim 22, further comprising a random access memory (RAM) accessed by the first CPU or the second CPU core.

24. The system of claim 23, wherein the RAM comprises a DRAM.

25. The system of claim 24, wherein the RAM comprises a dual port DRAM.

26. The system of claim 22, wherein the first card interface comprises a MoviNAND interface.

27. The system of claim 22, wherein the first card interface protocol comprises an MMC protocol.

28. The system of claim 22, wherein the second card interface protocol comprises a NAND flash protocol.

29. The system of claim 22, wherein the device busy state machine supports a dual core CPU, wherein the device busy state machine shares access to the card storage device between the first and second CPU cores using a round-robin method.

30. The system of claim 22, wherein the device busy state machine supports a dual core CPU, wherein the device busy state machine shares access to the nonvolatile memory between the first and second CPU cores using a master-slave method.

* * * * *